(12) United States Patent
Tamura et al.

(10) Patent No.: US 9,465,449 B2
(45) Date of Patent: Oct. 11, 2016

(54) SENSOR CONFIGURATION OF A POINTING DEVICE OF A KEYBOARD

(71) Applicant: LENOVO (Singapore) PTE, LTD., New Tech Park (SG)

(72) Inventors: Fumio Tamura, Machida (JP); Takahide Wada, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/179,366

(22) Filed: Feb. 12, 2014

(65) Prior Publication Data

US 2014/0225830 A1 Aug. 14, 2014

(30) Foreign Application Priority Data

Feb. 12, 2013 (JP) ................................. 2013-023995

(51) Int. Cl.
*G06F 3/02* (2006.01)
*G06F 3/0338* (2013.01)

(52) U.S. Cl.
CPC ........... *G06F 3/0338* (2013.01); *G06F 3/0213* (2013.01)

(58) Field of Classification Search
CPC .................................................... G06F 3/0213
USPC ...................... 345/156, 168–172; 341/21–23
See application file for complete search history.

(56) References Cited

U.S. PATENT DOCUMENTS

| 5,220,521 A | * | 6/1993 | Kikinis | .......................... 708/138 |
| 5,407,285 A | * | 4/1995 | Franz | ..................... G05G 9/047 |
| | | | | 200/6 A |
| 6,360,622 B1 | * | 3/2002 | Shibata | ........................ 73/866.1 |
| 8,373,664 B2 | * | 2/2013 | Wright | ........................... 345/173 |
| 2001/0029128 A1 | * | 10/2001 | Horiuchi et al. | ............. 439/578 |

FOREIGN PATENT DOCUMENTS

| JP | 07-244559 | 9/1995 |
| JP | 08-152962 | 6/1996 |
| JP | 2001-043011 | 2/2001 |
| JP | 2004-171200 | 6/2004 |
| JP | 2012-208870 | 10/2012 |

* cited by examiner

*Primary Examiner* — Ram Mistry
(74) *Attorney, Agent, or Firm* — Kunzler Law Group (57) ABSTRACT

A pointing device is attached to a keyboard assembly. The pointing device includes an operation post; a sensor substrate that converts force applied to the operation post into an analog electric signal; a logic substrate that is attached to a rear surface of the keyboard assembly and generates a digital signal to move a cursor from the electric signal; and a cable that connects the sensor substrate and the logic substrate to each other. It is possible to reduce the area of a portion protruding to a lower side from the rear surface of the keyboard assembly in the vicinity of the operation post and to lower the height of the portion by separating the sensor substrate and the logic substrate from each other. Since the cable is separated from a motherboard, it is possible to reduce noise entering the cable which transmits an analog signal.

21 Claims, 5 Drawing Sheets

SENSOR CONFIGURATION OF A POINTING DEVICE OF A KEYBOARD

FIELD

The subject matter disclosed herein relates to an attachment structure of a pointing device to a keyboard assembly that is mounted in a portable computer.

BACKGROUND

A pointing device of a computer generates a signal to move a cursor that is displayed on a screen of the computer according to an operation of a user. As the pointing device, there is a pointing stick other than a mouse and a touch pad. The pointing stick is provided among keys of a keyboard. One such pointing stick is called a track Point®. The pointing stick has been mainly used in a laptop personal computer (laptop PC) for the reasons that operation can be performed while a finger is placed in a home position, an operation space is not required as a case of using a mouse, and operation is easily performed while a computer is supported on knees in a train or a vehicle.

Figure 6A:
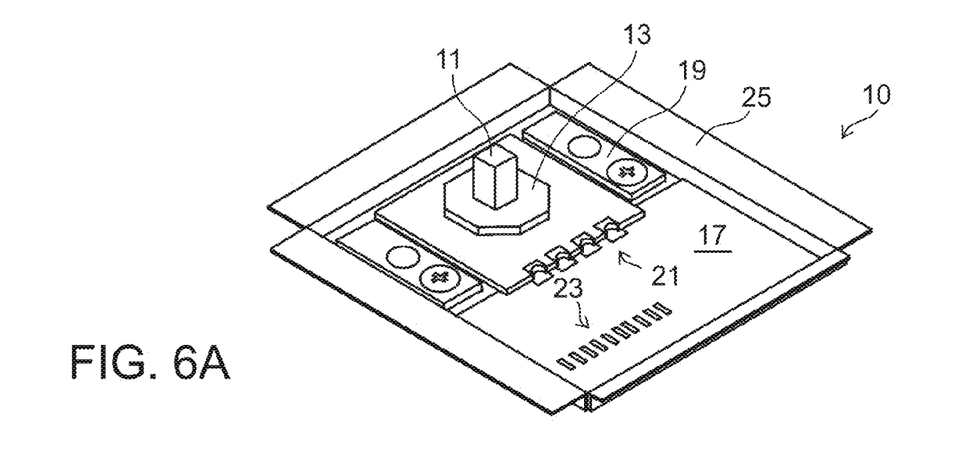
FIGS. 6A and 6B are perspective views illustrating a structure of a pointing stick in the related art.
Figure 6B:
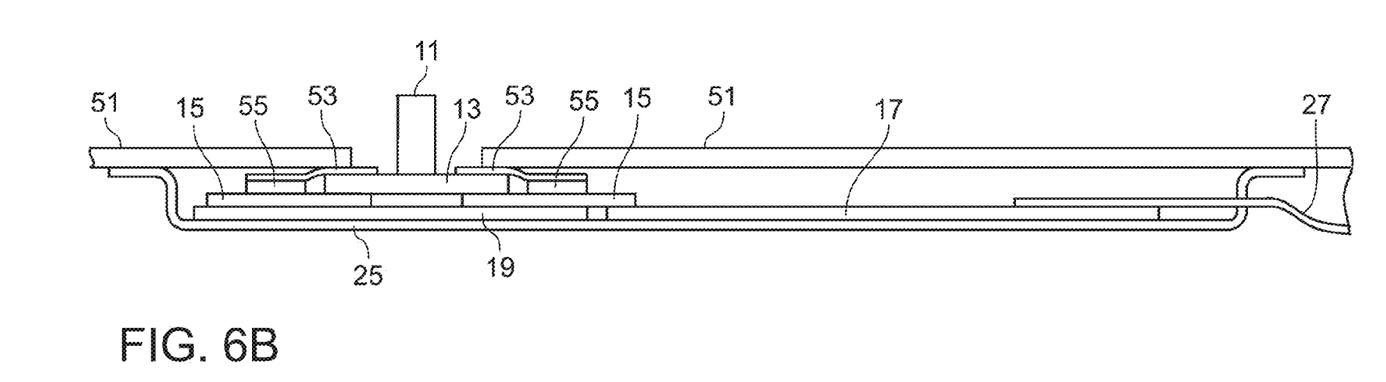

Since the pointing stick includes a circuit substrate or a shield cover, the pointing stick has influence on the entire thickness of a laptop PC. In order to reduce the thickness of a laptop PC, it is demanded to facilitate further thickness and size reduction of the pointing stick. FIGS. 6A and 6B are views illustrating a structure of a pointing stick in the related art. FIG. 6A is a perspective view of a pointing stick 10, and FIG. 6B is a cross-sectional view illustrating a state in which the pointing stick is attached to a keyboard assembly.

An operation post 11 is covered by a cap of which a surface is formed of a soft material such as silicon rubber (not illustrated) and is used to move a cursor by applying force in a horizontal direction by a finger of a user. The operation post 11 is arranged almost in the center of the keyboard assembly so as to easily move the cursor while the user operates keys. The operation post 11 is bonded to a sensor printed circuit board (PCB) 13 with an adhesive. Strain gauges (not illustrated) are bonded on the rear surface of the sensor PCB 13 in X and Y directions.

The sensor PCB 13 is bonded to a base PCB 15 with an adhesive. A circular opening is formed in the center portion of the base PCB 15, and the sensor PCB 13 causes a tensile force or compression force to be applied to the strain gauge with the force applied to the operation post 11. The base PCB 15 has a terminal unit 21 connected to a logic PCB 17 by soldering. The base PCB 15 is bonded to a base plate 19 with an adhesive. The logic PCB 17 has an operational amplifier, a processor and the like mounted thereon and converts a change in the electrical resistance of the strain gauge into voltage, and further, generates a digital signal corresponding to a moving direction, a moving amount, and a moving speed of the cursor according to the force applied to the operation post 11.

The logic PCB 17 outputs the generated digital signal to a controller of a motherboard through flexible flat cables (FFCs) 27 which are connected to the terminal unit 23. A metal shield cover 25 covers the entire pointing stick 10 to suppress influence of electromagnetic waves emitted from the motherboard handling a high frequency signal. The base plate 19 is attached to the shield cover by a screw. The pointing stick 10 is provided with a waterproof sheet 53 and a waterproof ring 55 for waterproofing countermeasures and attached to a keyboard substrate 51 using a screw hole of the base plate 19.

SUMMARY

In pointing devices using a strain gauge in the related art, a logic PCB on which a semiconductor chip calculating a coordinate signal by converting an analog signal corresponding to a change in the electrical resistance of the strain gauge into a digital signal is mounted has been provided in the vicinity of the strain gauge as in the examples illustrated in FIGS. 6A and 6B or in the example disclosed in Patent Document 2. The reasons can be as follows: since noise easily enters a cable that transmits an analog signal, a distance between the strain gauge and the logic PCB is intended to be decreased as much as possible; as long as the pointing device can output a digital coordinate signal, signal processing on a system side is not required so as to improve versatility; and a keyboard assembly on which such a pointing device is mounted can be circulated so as to increase added value.

In certain embodiments, the strain gauge and the logic PCB are connected by flexible flat cables (FFCs). In this case, the logic PCB is generally mounted on the motherboard in the laptop PC in the related art. When further thickness reduction of the laptop PC is demanded, the area of the shield cover 25 protruding to the lower side from the rear surface of the keyboard substrate 51 is large and the position of the shield cover 25 is on a main region in the center of the motherboard in the pointing stick 10 in FIGS. 6A and 6B. Thus, there are problems that the degree of freedom of designing the motherboard is limited and a sufficiently low height is not obtained.

When the logic PCB is mounted on the motherboard, noise easily enters the FFCs provided from the sensor PCB to the motherboard and has influence on mounting on the motherboard. Accordingly, it is preferable that the logic PCB 17 be arranged in a place which has a little influence of noise and does not have influence on the attachment structure of the motherboard.

The present invention provides a pointing device which is attached to a keyboard assembly to be mounted in a portable computer. The pointing device includes: an operation post; a sensor substrate which converts force applied to the operation post into an analog electric signal; a logic substrate which is attached to a rear surface of the keyboard assembly and generates a digital signal to move a cursor from the electric signal; and a cable which connects the sensor substrate and the logic substrate to each other.

It is possible to reduce the area of a portion protruding to a lower side from a rear surface of a keyboard substrate in the vicinity of the operation post and to lower the height of the portion by separating the sensor substrate and the logic substrate from each other. Accordingly, thickness reduction of the portable computer can be facilitated. Since the logic substrate is attached to the rear surface of the keyboard assembly and the cable is separated from the motherboard, noise entering the cable that transmits an analog signal can be reduced. Therefore, the present invention can be applied to a highly sensitive pointing stick which is sensitive to noise.

Further, it is unnecessary that the function of the logic substrate be added in the motherboard to output a digital signal for moving a cursor from the keyboard assembly, and the degree of freedom of designing the motherboard is improved. The logic substrate may be attached around the keyboard assembly. Since the center portion of the keyboard assembly particularly easily interferes with the motherboard, the degree of freedom of designing the motherboard can be improved. In one embodiment, the logic substrate may be arranged below a space key.

Since the space key is relatively large among keys, a space for attaching the sensor substrate therein is easily secured. The logic substrate may be arranged in an attachment space formed by cutting off a part of a metal plate arranged below the key top of the space key. By cutting off the metal plate, the height of a portion in which the logic substrate protrudes to the lower side can be lowered.

The logic substrate may be arranged in an attachment space which is formed by cutting off a part of a membrane sheet arranged on the metal plate. By cutting off a part of the membrane sheet, a height of a portion in which the logic substrate protrudes to the lower side can be further lowered. When the membrane sheet is formed of plural layers, waterproofing properties can be secured by leaving the uppermost layer of the plural layers in the attachment space. When an engaging portion which is formed by bending the metal plate and fixes a supporting structure that supports a key top and is provided, the engaging portion is arranged outside the projection of the attachment space and thus, waterproofing properties can be secured by the uppermost layer of the membrane sheet. As the supporting structure, a pantograph can be adopted.

According to the present invention, it is possible to provide a pointing device in which size reduction is facilitated. Further, according to the present invention, it is possible to provide a pointing device in which thickness reduction is facilitated. Furthermore, according to the present invention, it is possible to provide a keyboard assembly and a portable computer on which such a pointing device is mounted.

DETAILED DESCRIPTION

Figure 1:
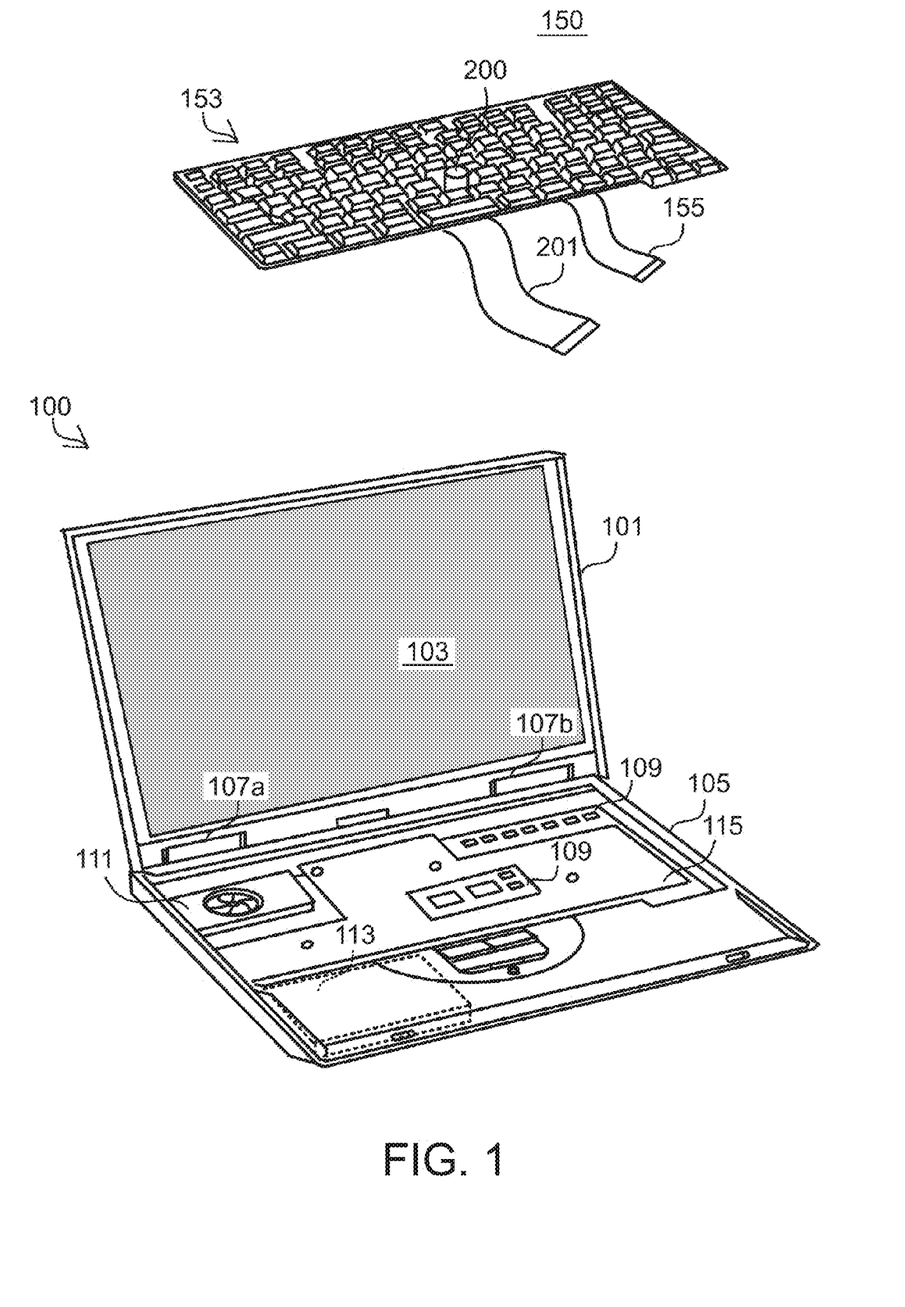
FIG. 1 is a perspective view of a laptop PC 100.

FIG. 1 is a perspective view schematically illustrating a configuration of a laptop PC 100. FIG. 1 illustrates a state in which a keyboard assembly 150 is detached. The laptop PC 100 is configured such that a display housing 101 which stores a display 103 and a system housing 105 on which a large number of electronic devices are mounted are coupled by hinge mechanisms 107a and 107b. On the surface of the keyboard assembly 150, a key group 153 configured with plural keys, and a pointing stick 200 are mounted.

In the system housing 105, a motherboard (system planar) 109 on which a CPU, a chipset, a main memory, a circuit pattern and the like are mounted, a radiation fan 111, a hard disk drive 113 and the like are stored. The keyboard assembly 150 is connected to the motherboard 109 by a flexible flat cable (FFC) 201 which transmits a digital coordinate signal generated by the pointing stick 200 and an FFC 155 which transmits an operation signal of a key switch.

Since the electronic devices that are mounted on the motherboard 109 are operated by a high frequency signal, the electronic devices easily emit electromagnetic waves to the outside or the electronic devices are easily influenced by electromagnetic waves entering from the outside. Accordingly, the laptop PC 100 adopts a structure in which the electronic devices are covered with a shielding plate 115 formed of a conductive metal material such as aluminum or copper to prevent such electromagnetic interference (EMI) so that electromagnetic waves emitted from the inside or entering from the outside are reflected or absorbed so as not to pass the shielding plate.

The shielding plate 115 also imparts a reference potential common to each electronic device. FIG. 1 illustrates a state in which the motherboard 109 is arranged on the lower side in which the keyboard assembly 150 is mounted over a wide range and the shielding plate 115 is arranged thereon. The shielding plate 115 covers the inside electronic devices and circuit substrates from the vicinity thereof. However, the shielding plate is partially opened in a range that cannot be closed for device mounting or in a range that is allowed as EMI countermeasures. Particularly, a part of the motherboard 109 is exposed from an opening of the shielding plate 115 on the lower side of the pointing stick 200.

Figure 2A:
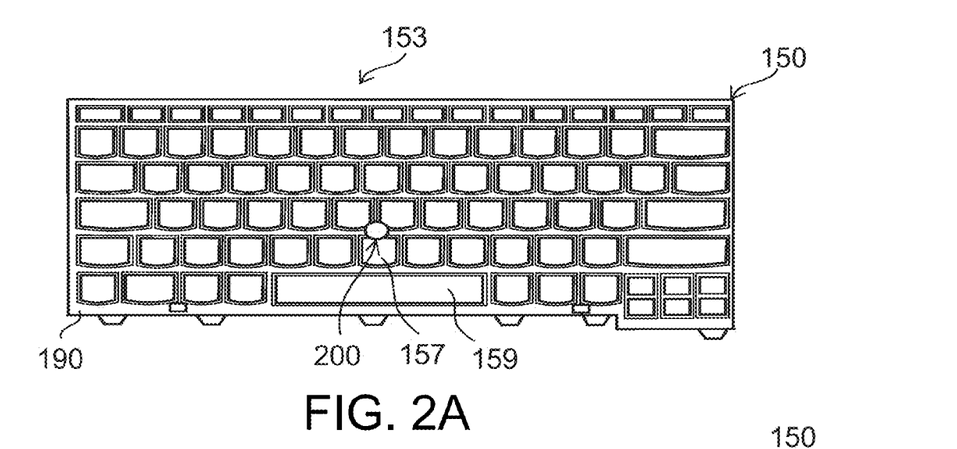
FIGS. 2A and 2B are plan views of a keyboard assembly 150.
Figure 2B:
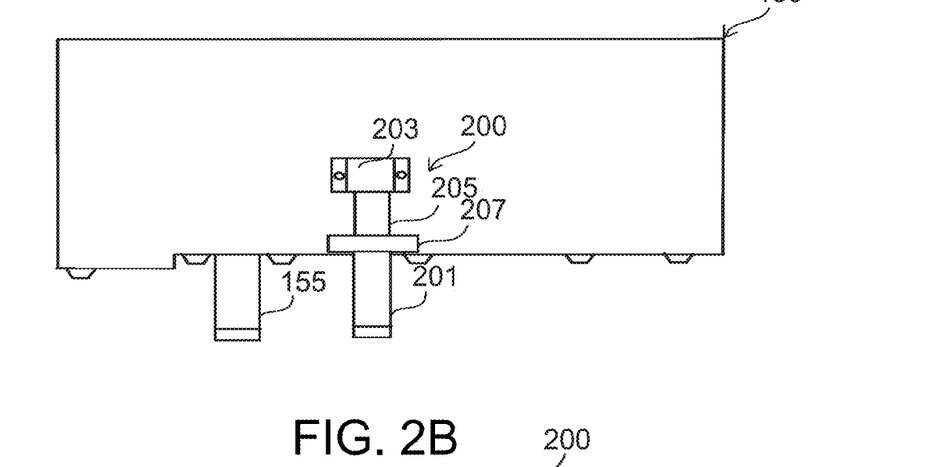

FIGS. 2A and 2B are a plane view and a bottom view of the keyboard assembly 150. The key group 153 includes keys 157 and a space key 159. A gap between the keys of the key group 153 is covered by a decorative frame 190. Since the keyboard assembly 150 is provided with a gap between the keys, the planar shape of the key top in the keyboard assembly is smaller than a planar shape of a key top in a keyboard assembly which is provided without a gap.

Therefore, even when the end of the key top is pressed, it is possible to maintain a stable posture. The pointing stick 200 includes three blocks, a sensor block which applies strain to a strain gauge according to force applied to the operation post, a transmission block which transmits an analog signal generated by a change in the electric resistance of the strain gauge, and a logic block which generates a digital coordinate signal from the analog signal received from the transmission block.

Figure 3:
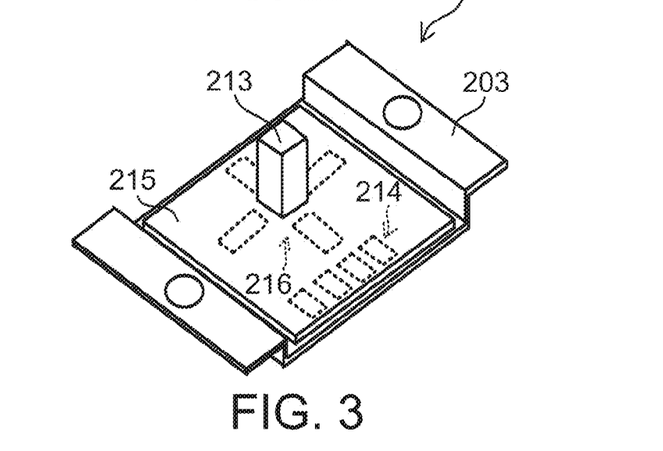
FIG. 3 is a perspective view of a sensor block configuring a pointing stick 200.

The rear side of the keyboard assembly 150 is shown in FIG. 2B and includes a shield cover 203 which constitutes a part of the sensor block, an FFC 205 which constitutes the transmission block, and a logic PCB 207 which constitutes the logic block. The FFC 201, which is connected to the motherboard 109, is connected to the logic PCB 207. FIG. 3 is a perspective view of the sensor block of the pointing stick 200, and FIGS. 4A and 4B are cross-sectional views of the sensor block.

Figure 4A:
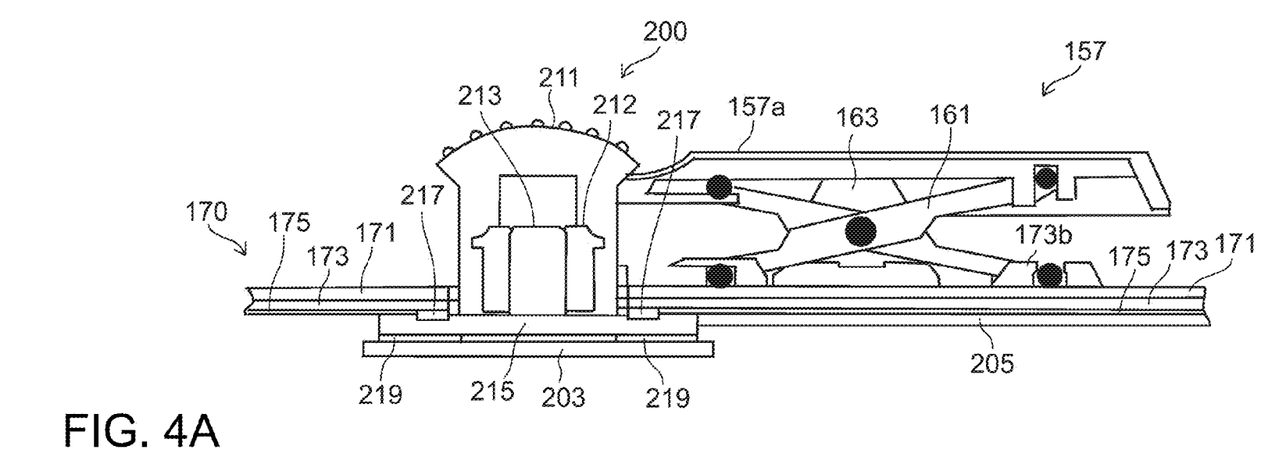
FIGS. 4A and 4B are cross-sectional views of the sensor block configuring the pointing stick 200.
Figure 4B:
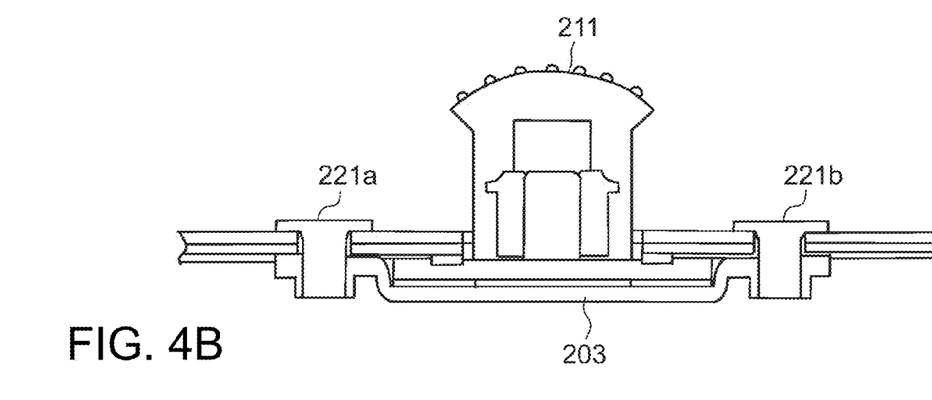

FIGS. 4A and 4B illustrate a cross-sectional view of the pointing stick 200 as seen from the front of the system housing 105 and a cross-sectional view of the pointing stick as seen from the side of the system housing 105. A rubber cap 211 is fitted to a ceramic operation post 213 through an intermediate member 212. The operation post 213 is bonded to a sensor PCB 215 with an adhesive. The sensor PCB 215 is attached to the shield cover 203 with a spacer 219 having an opening formed in the center interposed therebetween. Strain gauges 216 (of FIG. 3) are orthogonally bonded to the rear surface of the sensor PCB 215. Due to a space formed by the spacer 219, the sensor PCB 215 is strained by the force applied to the operation post 213 and the electrical resistance of the strain gauge 216 is changed.

The strain gauge 216 is connected to the FFC 205 by a terminal pattern 214 formed on the rear surface of the sensor PCB 215. The strain gauge 216 and the terminal pattern 214 are connected to each other by a wiring pattern (not illustrated). The shield cover 203 is attached to a keyboard substrate 170 configuring the bottom surface of the keyboard assembly 150 by screws 221a and 221b. The shield cover 203 prevents noise from entering an electrical circuit through which an electrical signal of the strain gauge 216 passes.

The keyboard substrate 170 is formed by laminating, from above, a membrane sheet 171, a thin plate-like metal plate 173 which is formed of aluminum, and a waterproof sheet 175 which is formed of a plastic film. The membrane sheet 171 has a structure in which two plastic films of an upper layer in which a number of wiring patterns and a contact point configuring a key switch are respectively printed on the surface and a lower layer are laminated with an intermediate layer interposed there between as a spacer. Through the FFC 155, each contact point of one plastic film is connected to a scan line of the motherboard 109 and each contact point of the other plastic film is connected to a decoder line.

On the metal plate 173, engaging portions 173a and 173b are formed by partially cutting off and bending the metal plate. In the vicinity of a place where the engaging portions 173a and 173b are formed, the membrane sheet 171 is also partially cut off. The waterproof sheet 175 prevents water drops falling down in the portion in which the membrane sheet 171 is partially cut off from entering the system housing 105. A waterproof ring 217 is arranged between the waterproof sheet 175 and the sensor PCB 215.

Each key of the key group 153 is different in an external size but has the same basic structure in an operation mechanism. The key 157 includes a key top 157a, a pantograph 161, and a rubber dome 163. The bottom portion of the pantograph 161 is fixed to the engaging portions 173a and 173b, and the upper portion thereof is fitted to grooves formed on the rear surface of the key top 157a. The top portion of the rubber dome 163 is in contact with the rear side of the key top 157a. The rubber dome 163 receives pressure when the key top 157a is pressed, and is pushed downward to operate the key switch. The rubber dome can be returned to the original shape by restoring force when the pressure is released.

Figure 5A:
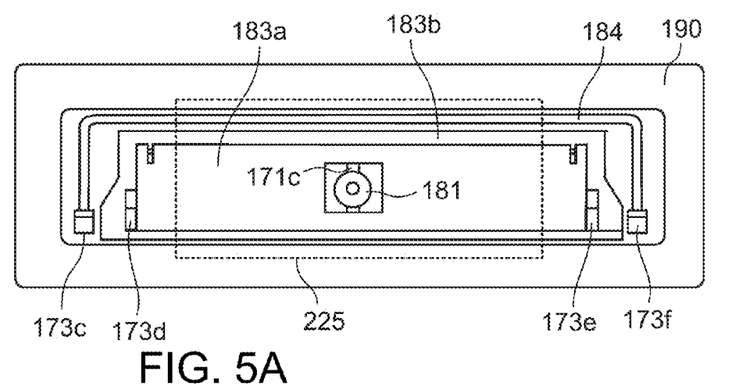
FIGS. 5A and 5B are a plan view and a cross-sectional view illustrating an attachment structure of a logic block configuring the pointing stick 200.
Figure 5B:
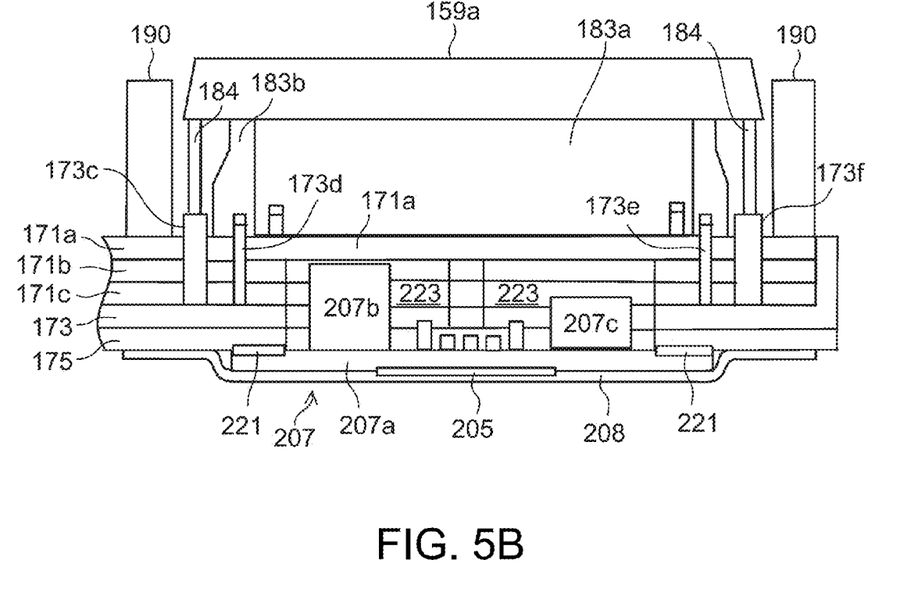

FIGS. 5A and 5B are a plan view and a cross-sectional view illustrating an attachment structure of the logic block of the pointing stick 200. In the plan view, a key top 159a of a space key 159 is removed. In addition, for a brief description of a cross-sectional structure, a scale in a vertical direction is enlarged in the cross-sectional view. In the logic PCB 207, it is preferable to lower a height of a portion which protrudes to the lower side of the waterproof sheet 175 as much as possible.

In order to lower the height, a method in which the membrane sheet 171, the metal plate 173 and the waterproof sheet 175 are partially cut off to secure an attachment space can be used. However, when the waterproof sheet 175 on the lowermost layer is cut off, it is necessary to secure waterproofing properties against a liquid flowing between the keys using another method. In one embodiment, a place just below the space key 159 which has the largest key top shape in the key group 153 of the keyboard assembly 150 is selected as a position for the logic PCB 207. As described below, when the shape of the key top is large, waterproofing properties are easily secured in a case of cutting off the waterproof sheet 175.

However, the position of the logic PCB 207 in the present invention is not limited to the place just below the space key 159. The logic PCB 207 may be arranged in any location remote but substantially proximal to the sensor PCB 215. In one embodiment the logic PCB 207 is disposed on the back of the keyboard assembly, and may be located just below an Enter key, a Caps Lock key, a shift key, a backspace key or the like which has relatively a large key top shape in the key group 153. Further, the logic PCB 207 may be divided into plural pieces and arranged just below various keys. Furthermore, when the waterproof sheet 175 is not cut off, the logic PCB may be arranged at any place avoiding the center portion which easily interferes with the motherboard 109.

The membrane sheet 171 includes an upper layer 171a having contact points formed on one side, a lower layer 171c having contact points formed on the other side, and an intermediate layer 171b interposed therebetween. An attachment space 223 of the logic PCB 207 is formed by removing the waterproof sheet 175, the metal plate 173, the lower layer 171c and the intermediate layer 171b in a predetermined range just below the space key 159. The upper layer 171a is left to secure waterproofing properties of the logic PCB 207 since the waterproof sheet 175 is cut off.

Since the metal plate 173, the lower layer 171c and the intermediate layer 171b are left in a region in which the rubber dome 181 is arranged, the attachment space 223 is divided into two spaces. The attachment space 223 may be formed by leaving the intermediate layer 171b or the lower layer 171c. Semiconductor chips 207b and 207c are mounted on a PCB 207a configuring the logic PCB 207.

The semiconductor chips 207b and 207c generate a digital signal corresponding to a moving direction, a moving amount, and a moving speed of a cursor, from an analog signal corresponding to a change in the electrical resistance of the strain gauge 216 changing according to the strain of the sensor PCB 215 at the time when the cap 211 is pressed in a horizontal direction, to output the digital signal to the motherboard 109 through the FFC 201. The PCB 207a is bonded to the waterproof sheet 175 with a double-sided tape 221 so as to store the semiconductor chips 207b and 207c in the attachment spaces 223.

The key top 159a, pantographs 183a and 183b, a stabilizer bar 184, and a rubber dome 181 are arranged in a storage space for the space key 159 which is sectioned by the decorative panel 190. The bottom portion of the stabilizer bar 184 is fixed to engaging portions 173c and 173f formed by partially bending the metal plate 173, and the upper portion is in contact with the rear side of the key top 159a to stably hold the posture of the key top 159a.

In the same manner, the leg portions of the pantographs 183a and 183b are fixed to engaging portions 173d and 173e and the like and the upper portions are fitted to grooves formed on the rear surface of the key top 159a. The engaging portions 173c to 173f are arranged outside a projection 223a of the attachment spaces 223 with respect to the membrane sheet 171. Therefore, the waterproof sheet 175 secures waterproofing properties in a region in which the engaging portions 173c to 173f are arranged, and the upper layer 171a of the membrane sheet 171 secures waterproofing properties in the upper portion of the attachment space 223. An aluminum sheet 208 is bonded to the bottom surface of the substrate 207a as EMI countermeasures.

In the supporting structure of the related art in the space key 159, two small pantographs are provided on both sides of the rubber dome 181. However, in this case, since engaging portions of a metal plate which fix the pantographs pass through a membrane sheet, and the waterproof sheet 175 is not present inside the attachment space 223, waterproofing properties cannot be secured. In the embodiment, one large pantograph is adopted and the engaging portions 173c to 173f are not provided inside the attachment spaces 223.

The pointing stick 200 has the logic PCB 207 provided around the keyboard assembly 150 not on the motherboard 109. Accordingly, since the FFC 205 which transmits an analog signal can be shortened in length and is not provided in the close vicinity of the motherboard 109, entering of noise can be reduced. In addition, as illustrated in FIG. 3, since the area of the shield cover 203 protruding to the lower side from the waterproof sheet 175 in the center portion of the keyboard assembly 150 is small, the degree of freedom of designing the motherboard 109 can be improved, compared with in FIGS. 6A and 6B. Further, since the base plate 19 can be omitted compared with the pointing stick 10 in FIGS. 6A and 6B, the height can be lowered.

Although the present invention has been described with reference to specific embodiments illustrated in the drawings, it should be noted that the present invention is not limited to the embodiments illustrated in the drawings, and any configuration that has been known until now can be adopted as long as the effect of the present invention can be obtained.

What is claimed is:

1. An apparatus comprising:
an operation post of a pointing device, the operation post arranged among keys of a keyboard assembly;
a sensor substrate that converts force applied to the operation post into an analog electric signal;
a logic substrate disposed remote to the sensor substrate, the logic substrate comprising one or more semiconductor chips located on an inner surface of the logic substrate and protruding perpendicular to the inner surface of the logic substrate, the inner surface of the logic substrate located between the logic substrate and a front surface of the keyboard assembly, the one or more semiconductor chips inserted into one or more corresponding recesses located on a rear surface of the keyboard assembly, the one or more recesses formed to receive the one or more semiconductor chips by removing at least a portion of one or more layers of the keyboard assembly such that the one or more semiconductor chips fit into the one or more recesses of the keyboard, the outer surface of the logic substrate sitting substantially flush with the rear surface of the keyboard assembly when the one or more semiconductor chips are inserted into the one or more recesses, the one or more semiconductor chips generating a digital signal to move a cursor based on the analog electric signal; and
a cable connecting the sensor substrate and the logic substrate.

2. The apparatus of claim 1, wherein the logic substrate is disposed proximal to the keyboard assembly.

3. The apparatus of claim 1, wherein the logic substrate is disposed underneath a space key of the keyboard assembly.

4. The apparatus of claim 3, wherein the logic substrate is arranged in an attachment space formed by an omitted portion of a metal plate arranged below a key top of the keyboard assembly.

5. The apparatus of claim 4, further comprising:
a supporting structure that supports the key top of the keyboard assembly;
an engaging portion that is formed by a bent portion of the metal plate, the engaging portion fixing the metal plate in position; and
wherein the engaging portion is arranged outside a projection of the attachment space.

6. The apparatus of claim 5, wherein the supporting structure includes a pantograph.

7. The apparatus of claim 3, wherein the logic substrate is arranged in an attachment space formed from an omitted portion of a membrane sheet of the keyboard assembly.

8. The apparatus of claim 7, wherein the membrane sheet is formed of a plurality of layers and an uppermost layer of the plurality of the layers remains in the attachment space.

9. The apparatus of claim 1, wherein the logic substrate is attached to a rear surface of the keyboard assembly.

10. A system comprising:
a portable computer;
a display communicably coupled to the portable computer;
an operation post that is arranged among keys of a keyboard assembly;
a sensor substrate that converts force applied to the operation post into a change in electrical resistance;
a logic substrate disposed remote to the sensor substrate, the logic substrate comprising one or more semiconductor chips located on an inner surface of the logic substrate and protruding perpendicular to the inner surface of the logic substrate, the inner surface of the logic substrate located between the logic substrate and a front surface of the keyboard assembly, the one or more semiconductor chips inserted into one or more corresponding recesses located on a rear surface of the keyboard assembly, the one or more recesses formed to receive the one or more semiconductor chips by removing at least a portion of one or more layers of the keyboard assembly such that the one or more semiconductor chips fit into the one or more recesses of the keyboard, the outer surface of the logic substrate sitting substantially flush with the rear surface of the keyboard assembly when the one or more semiconductor chips are inserted into the one or more recesses, the one or more semiconductor chips generating a cursor signal to move a cursor displayed on the display based on the change in electrical resistance; and
a cable that connects the sensor substrate and the logic substrate.

11. The system of claim 10, wherein the logic substrate is attached to a rear surface of the keyboard assembly.

12. The system of claim 10, wherein the logic substrate is disposed proximal to the keyboard assembly.

13. The system of claim 10, wherein the logic substrate is disposed underneath a space key of the keyboard assembly.

14. The system of claim 13, wherein the logic substrate is arranged in an attachment space formed by an omitted portion of a metal plate arranged below a key top of the keyboard assembly.

15. The system of claim 14, further comprising:
a supporting structure that supports the key top of the keyboard assembly; and
an engaging portion that is formed by a bent portion of the metal plate, the engaging portion fixing the metal plate in position;
wherein the engaging portion is arranged outside a projection of the attachment space.

16. The system of claim 15, wherein the supporting structure includes a pantograph.

17. The system of claim 13, wherein the logic substrate is arranged in an attachment space formed from an omitted portion of a membrane sheet of the keyboard assembly.

18. The system of claim 17, wherein the membrane sheet is formed of a plurality of layers and an uppermost layer of the plurality of the layers remains in the attachment space.

19. A method comprising:
converting a force applied to an operation post into a change in electrical resistance using a sensor substrate, the operation post being arranged among keys of a keyboard assembly;
generating a cursor signal to move a cursor displayed on a display of a computer based on the change in electrical resistance using a logic substrate, the logic substrate disposed remote to the sensor substrate, the logic substrate comprising one or more semiconductor chips located on an inner surface of the logic substrate and protruding perpendicular to the inner surface of the logic substrate, the inner surface of the logic substrate located between the logic substrate and a front surface of the keyboard assembly, the one or more semiconductor chips inserted into one or more corresponding recesses located on a rear surface of the keyboard assembly, the one or more recesses formed to receive the one or more semiconductor chips by removing at least a portion of one or more layers of the keyboard assembly such that the one or more semiconductor chips fit into the one or more recesses of the keyboard, the outer surface of the logic substrate sitting substantially flush with the rear surface of the keyboard assembly when the one or more semiconductor chips are inserted into the one or more recesses; and
connecting the sensor substrate and the logic substrate using a cable.

20. The method of claim 19, further comprising arranging the logic substrate in an attachment space formed from an omitted portion of a membrane sheet of the keyboard assembly.

21. The method of claim 19, further comprising arranging the logic substrate in an attachment space formed by omitting a portion of the keyboard substrate arranged below a space key of the keyboard assembly.

* * * * *